US007086388B2

(12) United States Patent
Roth et al.

(10) Patent No.: US 7,086,388 B2
(45) Date of Patent: Aug. 8, 2006

(54) COMBINATION VALVE FOR FUEL SYSTEM (75) Inventors: Robert A. Roth, Grand Blanc, MI (US); Dennis P. McGrath, Ortonville, MI (US)

(73) Assignee: Delphi Technologies, Inc., Troy, MI (US)

( * ) Notice: Subject to any disclaimer, the term of this patent is extended or adjusted under 35 U.S.C. 154(b) by 249 days.

(21) Appl. No.: 10/634,085

(22) Filed: Aug. 4, 2003

(65) Prior Publication Data
US 2005/0028869 A1    Feb. 10, 2005

(51) Int. Cl.
*F02M 37/00* (2006.01)
*F16K 17/18* (2006.01)

(52) U.S. Cl. ............... 123/510; 137/493.3; 137/493.4; 137/493.6; 137/493.9

(58) Field of Classification Search ............. 137/493.3, 137/493.4, 493.6, 493.9; 123/510, 512
See application file for complete search history.

(56) References Cited

U.S. PATENT DOCUMENTS

| 115,982 | A | * | 6/1871 | Porteous ................. 137/493.4 |
| 2,704,035 | A |  | 3/1955 | Bader |
| 2,995,148 | A | * | 8/1961 | Novak et al. ............ 137/493.4 |
| 3,939,866 | A | * | 2/1976 | Pignatelli ................. 137/493.4 |
| 4,370,102 | A |  | 1/1983 | Sasaki et al. |
| 4,561,559 | A |  | 12/1985 | Rutan et al. |
| 5,339,785 | A | * | 8/1994 | Wilksch .................... 123/457 |
| 5,361,742 | A | * | 11/1994 | Briggs et al. .............. 123/506 |
| 5,477,829 | A |  | 12/1995 | Hassinger et al. |
| 5,582,202 | A |  | 12/1996 | Schultz et al. ........... 137/493.3 |
| 5,623,910 | A | * | 4/1997 | Riggle ..................... 123/510 |
| 5,673,670 | A |  | 10/1997 | Powell et al. |
| 5,794,657 | A |  | 8/1998 | Oberg |
| 5,839,414 | A | * | 11/1998 | Klinger et al. ............ 123/467 |
| 5,842,454 | A |  | 12/1998 | Miwa et al. |
| 6,024,072 | A |  | 2/2000 | Hamada |
| 6,345,606 | B1 |  | 2/2002 | Ricci-Ottati et al. |
| 6,352,067 | B1 |  | 3/2002 | Genslak |
| 6,360,766 | B1 |  | 3/2002 | Sawert et al. ............ 137/15.18 |
| 6,382,183 | B1 |  | 5/2002 | Preston et al. |

(Continued)

*Primary Examiner*—Stephen M. Hepperle
(74) *Attorney, Agent, or Firm*—Jimmy L. Funke (57) ABSTRACT

A combination valve for fuel delivery system of a vehicle having an engine, the fuel delivery system being configured to pump fuel to the engine and the fuel delivery system has a regulator for regulating the pressure of the fuel when it is being pumped to the engine by the fuel delivery system, the combination valve comprising: an outer housing defining an inner opening for slidably receiving a body portion of a system pressure relief valve therein, the body portion of the system pressure relief valve defining an inner opening for slidably receiving a body portion of a check valve therein, the body portion of the check valve being configured to provide a first fluid pathway in a first direction when the body portion of the check valve moves from a closed position to an open position as the body portion of the check valve moves in the first direction within the inner opening of the body portion of the system pressure relief valve, the body portion of the system pressure relief valve being configured to provide a second fluid pathway in a second direction when the body portion of the system pressure relief valve moves from a closed position to an open position as the body portion of the system pressure relief valve moves in the second direction within the inner opening of the outer housing, wherein the first direction being opposite to the second direction.

13 Claims, 5 Drawing Sheets

U.S. PATENT DOCUMENTS

| | | |
|---|---|---|
| 6,386,185 B1 | 5/2002 | Cooke |
| 6,401,695 B1 | 6/2002 | Cooke |
| 6,405,717 B1 | 6/2002 | Beyer et al. ................ 123/514 |
| 6,422,265 B1 | 7/2002 | Beyer et al. |
| 6,481,418 B1 | 11/2002 | Ristich et al. |
| 6,499,941 B1 | 12/2002 | Fischer |
| 6,562,502 B1 | 5/2003 | Haltiner, Jr. |
| 2003/0034073 A1 | 2/2003 | Roth ......................... 137/541 |
| 2003/0037822 A1 | 2/2003 | Fischer et al. .............. 137/528 |
| 2003/0051757 A1 | 3/2003 | Roth et al. .................. 137/541 |

* cited by examiner

COMBINATION VALVE FOR FUEL SYSTEM

CROSS REFERENCE TO RELATED APPLICATIONS

This application is related to commonly owned and assigned U.S. patent application Ser. No. 10/633,790, entitled: "APPARATUS AND METHOD FOR SETTING PRESSURE IN A FUEL DELIVERY SYSTEM" filed contemporaneously with this application, the contents of which are incorporated herein by reference thereto.

TECHNICAL FIELD

This application relates to fuel systems for vehicles, and in particular, a valve for a fuel line of a fuel delivery system.

BACKGROUND

It is known to provide a fuel tank in a vehicle to hold a reservoir of fuel to be used by an engine of the vehicle. It is also known to provide a fuel pump assembly inside the fuel tank to pump fuel from the reservoir to the engine. Typically, the fuel pump includes a one way check valve configured to allow fuel to exit the fuel pump or fuel tank via a fuel line under certain conditions. Generally, a forward flow check valve consists of a checking device, typically a plunger, such as a pintel having a seal, and a seat that when in contact form a leak proof seal. The pintel and seal are forced against the seat with a spring that provides the proper force to maintain pintel and seal to seat contact during no flow and low-pressure forward flow conditions. This force prevents flow from exiting the fuel tank when the vehicle fuel line is removed or when a sufficient amount of pressure is not in the line.

During a vehicle shut down pressure in the fuel delivery system past or downstream from the check valve of the fuel pump may increase due to heating of the fuel in the line, which may occur due to heat radiated from the engine after it is shut down. In order to provide a release for this pressure in a vehicle shut down situation a release valve can be positioned to provide the pressure release when a threshold value has been reached. The pressure release valve will allow fuel to be released back into the fuel reservoir. However, such a pressure release downstream from the check valve will cause air to be allowed into the fuel circuit due to the releasing of fuel under pressure. As the fuel and air in the line cool, a vacuum can be created in the fuel circuit downstream from the check valve resulting from the reduction in volume of liquid fuel. Moreover, if the vacuum in the fuel circuit is not sufficient to overcome the pressure setting of the check valve (e.g., spring closing force) a loss of fuel or fuel pressure may occur in the circuit after the check valve. Such a loss of fuel or pressure will have to be overcome during a starting sequence when the pump again starts to pump fuel into the circuit. Overcoming this loss of fuel or pressure in the circuit may cause the starting sequence to take longer than a starting sequence wherein there is no loss of fuel or pressure in the circuit.

In order to ensure that fuel system pressure is maintained at a certain pressure in the fuel rail during a vehicle shut down, a fuel pressure regulator can be modified to have an expensive lapping process to ensure that a desired fuel pressure is maintained in the fuel rail during vehicle shut down. However, the pressure release of the regulator will be at the same value as the regulator is designed to provide during pumping of the fuel in an engine running or starting sequence.

Accordingly, it is desirable to maintain a desirable fuel pressure in the fuel rail during vehicle shut down without modifying the fuel pressure regulator and limiting the number of valves positioned in the circuit.

SUMMARY

The above discussed and other drawbacks and deficiencies are overcome or alleviated by a combination valve for fuel delivery system of a vehicle having an engine, the fuel delivery system being configured to pump fuel to the engine and the fuel delivery system has a regulator for regulating the pressure of the fuel when it is being pumped to the engine by the fuel delivery system, the combination valve comprising: an outer housing defining an inner opening for slidably receiving a body portion of a system pressure relief valve therein, the body portion of the system pressure relief valve defining an inner opening for slidably receiving a body portion of a check valve therein, the body portion of the check valve being configured to provide a first fluid pathway in a first direction when the body portion of the check valve moves from a closed position to an open position as the body portion of the check valve moves in the first direction within the inner opening of the body portion of the system pressure relief valve, the body portion of the system pressure relief valve being configured to provide a second fluid pathway in a second direction when the body portion of the system pressure relief valve moves from a closed position to an open position as the body portion of the system pressure relief valve moves in the second direction within the inner opening of the outer housing, wherein the first direction being opposite to the second direction.

Another exemplary embodiment is a combination valve for fuel delivery system of a vehicle having an engine, the fuel delivery system being configured to pump fuel to the engine and the fuel delivery system has a regulator for regulating the pressure of the fuel when it is being pumped to the engine by the fuel delivery system, the combination valve comprising: an outer housing defining an inner opening for slidably receiving a body portion of a pump pressure relief valve therein, the body portion of the pump pressure relief valve defining an inner opening for slidably receiving a body portion of a system pressure relief valve therein, the body portion of the system pressure relief valve defining an inner opening for slidably receiving a body portion of a check therein, the body portion of the check valve being configured to provide a first fluid pathway in a first direction when the body portion of the check valve moves from a closed position to an open position as the body portion of the check valve moves in the first direction within the inner opening of the body portion of the system pressure relief valve, the body portion of the system pressure relief valve being configured to provide a second fluid pathway in a second direction when the body portion of the system pressure relief valve moves from a closed position to an open position as the body portion of the system pressure relief valve moves in the second direction within the inner opening of the pump pressure relief valve, the body portion of the pump pressure relief valve being configured to provide a third fluid pathway in the first direction when the body portion of the pump pressure relief valve moves from a closed position to an open position as the body portion of the pump pressure relief valve moves in the first direction within the inner opening of the outer housing, wherein the first direction being opposite to the second direction.

Another exemplary embodiment is a combination valve for a pump of a fuel delivery system of a vehicle having an engine, the fuel delivery system being configured to pump fuel to the engine, the combination valve comprising: an outer housing defining an inner opening for slidably receiving a body portion of a pump pressure relief valve therein, the body portion of the pump pressure relief valve defining an inner opening for slidably receiving a body portion of a check valve therein, the body portion of the check valve defining, the body portion of the check valve being configured to provide a first fluid pathway in a first direction when the body portion of the check valve moves from a closed position to an open position as the body portion of the check valve moves in the first direction within the inner opening of the body portion of the pump pressure relief valve, the body portion of the pump pressure relief valve being configured to provide a second fluid pathway in the first direction when the body portion of the pump pressure relief valve moves from a closed position to an open position as the body portion of the pump pressure relief valve moves in the first direction within the inner opening of the outer housing, the combination valve being configured to be in fluid communication with an outlet port of the pump, wherein the check valve opens under a lower pressure than the pump pressure relief valve.

The above-described and other features and advantages of the present invention will be appreciated and understood by those skilled in the art from the following detailed description, drawings, and appended claims.

DETAILED DESCRIPTION OF EXEMPLARY EMBODIMENTS

Disclosed herein is an apparatus and system that allows for relief of fuel in fuel pumping system when certain pressures are encountered. In accordance with exemplary embodiments of the present invention multiple valves are combined into a single unit or device thereby reducing costs and points of connection for the valves. The apparatus and systems disclosed herein allow for fuel to be relieved under certain pressure situations without adversely affecting the starting sequence of an engine the system supplies fuel to.

Figure 1:
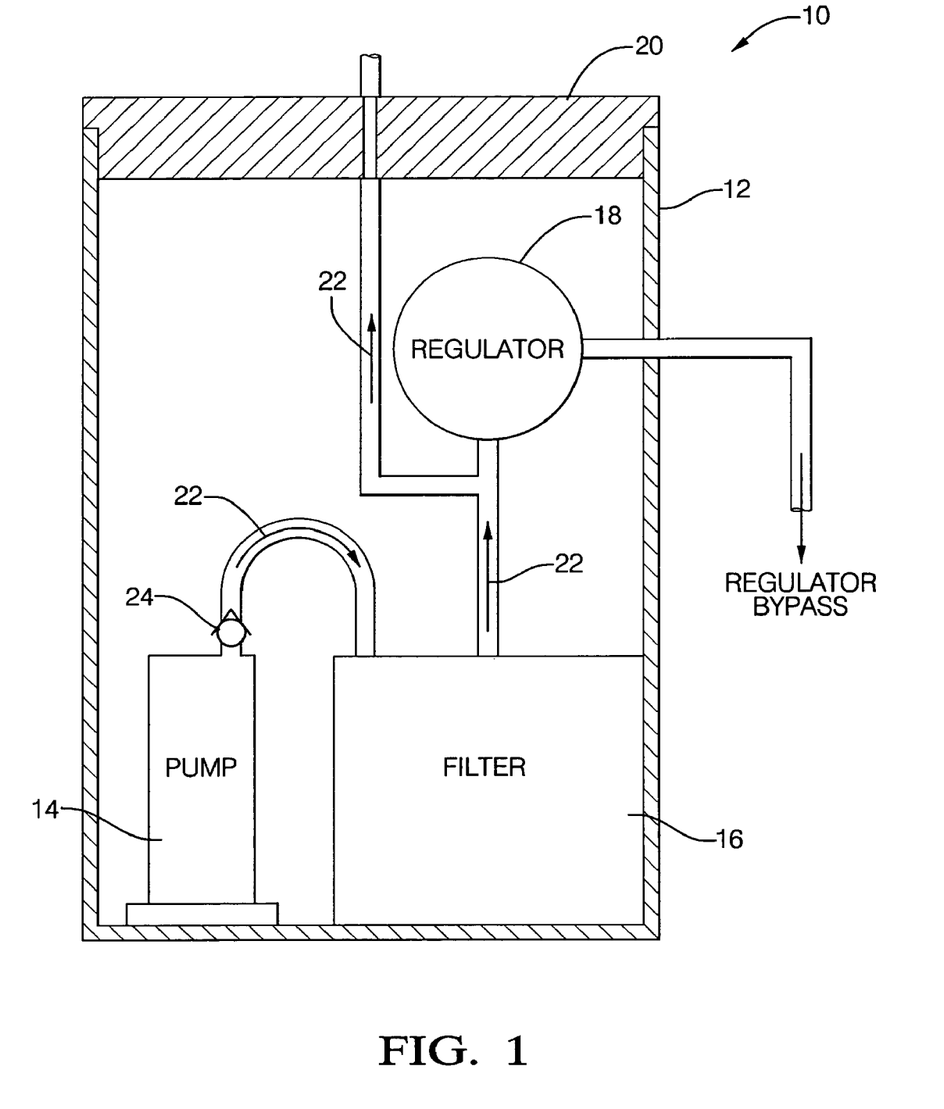
FIG. 1 is a schematic view of a fuel delivery system.

Referring now to FIG. 1, a portion of a typical fuel delivery system or modular reservoir assembly 10 is illustrated schematically. The modular reservoir assembly 10 is, as is known in the related arts, positioned within a fuel tank of a vehicle (not shown) for delivering fuel to an engine of a vehicle. The modular reservoir assembly comprises a bucket 12 in which a fuel pump 14, a filter 16 and a regulator 18 are housed. The bucket is inserted within the fuel tank or fuel reservoir and provides the necessary fluid paths for the fuel pump to be able to draw and pump fuel to the engine. Accordingly, the fuel pump is in fluid communication with fuel in the fuel tank. During an engine starting event and/or engine running event, fuel pump 14 provides fuel to the engine by pumping fuel to the filter, the regulator, and through a cover 20 by passing fuel through a plurality of conduits, in the direction of arrows 22, which ultimately provides fuel to the engine of the vehicle.

As is known in the related arts the regulator is provided to regulate the pressure of the pumped fuel in accordance with predetermined tolerances or pressures. Thus, the regulator ensures that the pumped fuel does not exceed a certain pressure.

In order to provide unhindered flow of fuel in the direction of arrows 22, a check valve 24 is positioned within fuel pump 14. Check valve 24 is configured to allow fuel flow and the direction of arrow 22 while preventing flow of fuel in a reverse direction or back into the fuel pump. An example of such a check valve is described in commonly owned and assigned U.S. patent application Ser. No. 09/992,079 filed on Nov. 19, 2001, the contents of which are incorporated herein by reference thereto.

As discussed above, it is desirable to provide an overpressure valve to allow for expanding heated fuel to escape from the fuel line back into the fuel reservoir during vehicle shut down. However, since the check valve is typically a valve which allows flow therethrough under a first set of conditions or pressures, while preventing back flow, an additional valve location is required for this feature since the flow of an overpressure valve in the fuel circuit will be in the opposite direction of the check valve. One attempt to provide this feature in the system illustrated in FIG. 1 is adapt the regulator to control the fuel pressure in the circuit during vehicle shut down. However, such a configuration can require costly processing modifications to be made to the regulator to prevent a loss of pressure in the fuel rail.

Moreover, the pressure relief of the modified regulator must be related to the pressure setting of the regulator which as discussed herein may not be the same pressure at which the over pressure relief is desired.

Figure 2:
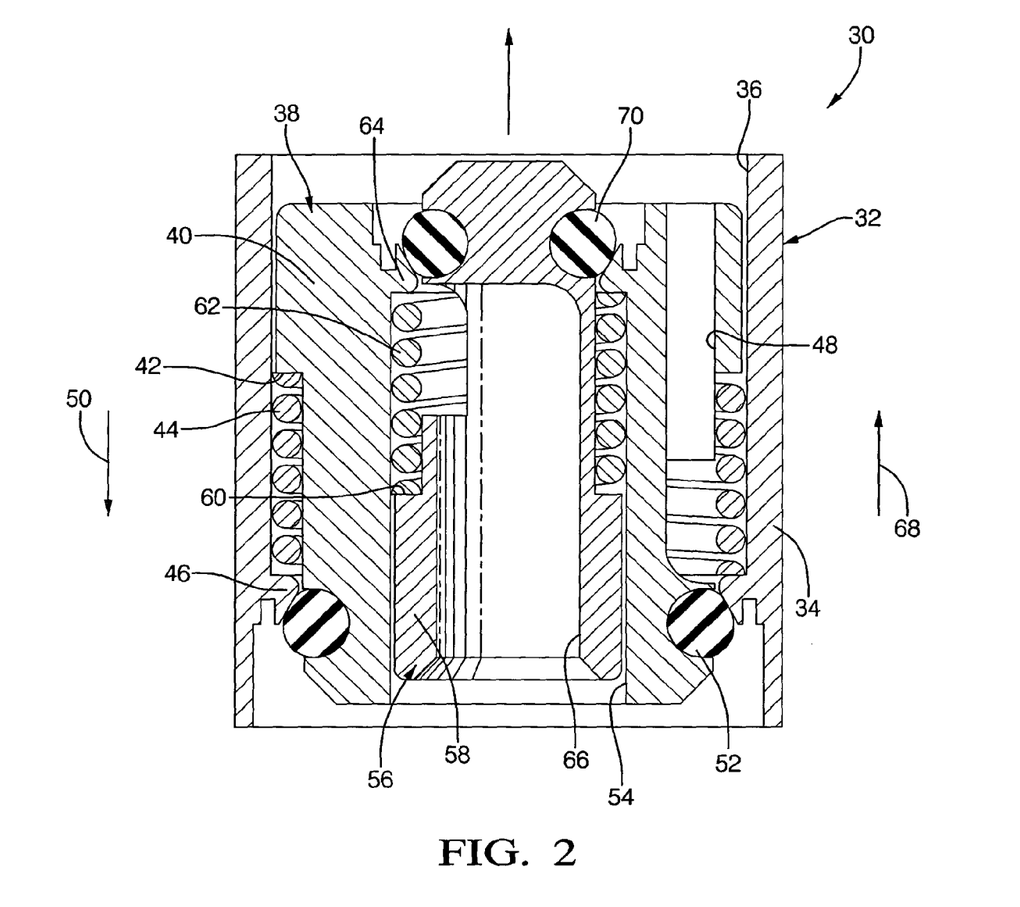
FIG. 2 is a cross sectional view of a combination valve constructed in accordance with an exemplary embodiment of the present invention.

Referring now to FIG. 2, and in accordance with an exemplary embodiment of the present invention, a combination fuel system pressure valve and forward check valve 30 is illustrated. Valve 30 provides both a system overpressure relief valve and a check valve without requiring a costly regulator. This valve design is cost efficient through the use of combining the inner housing of the overpressure valve function with the outer member of the fuel line/forward flow check valve function. In addition, and since the two valves are combined into one unit there is only one installation interface while two separate and distinct flow paths are provided, which typically would require at least two installation interfaces.

Figure 3:
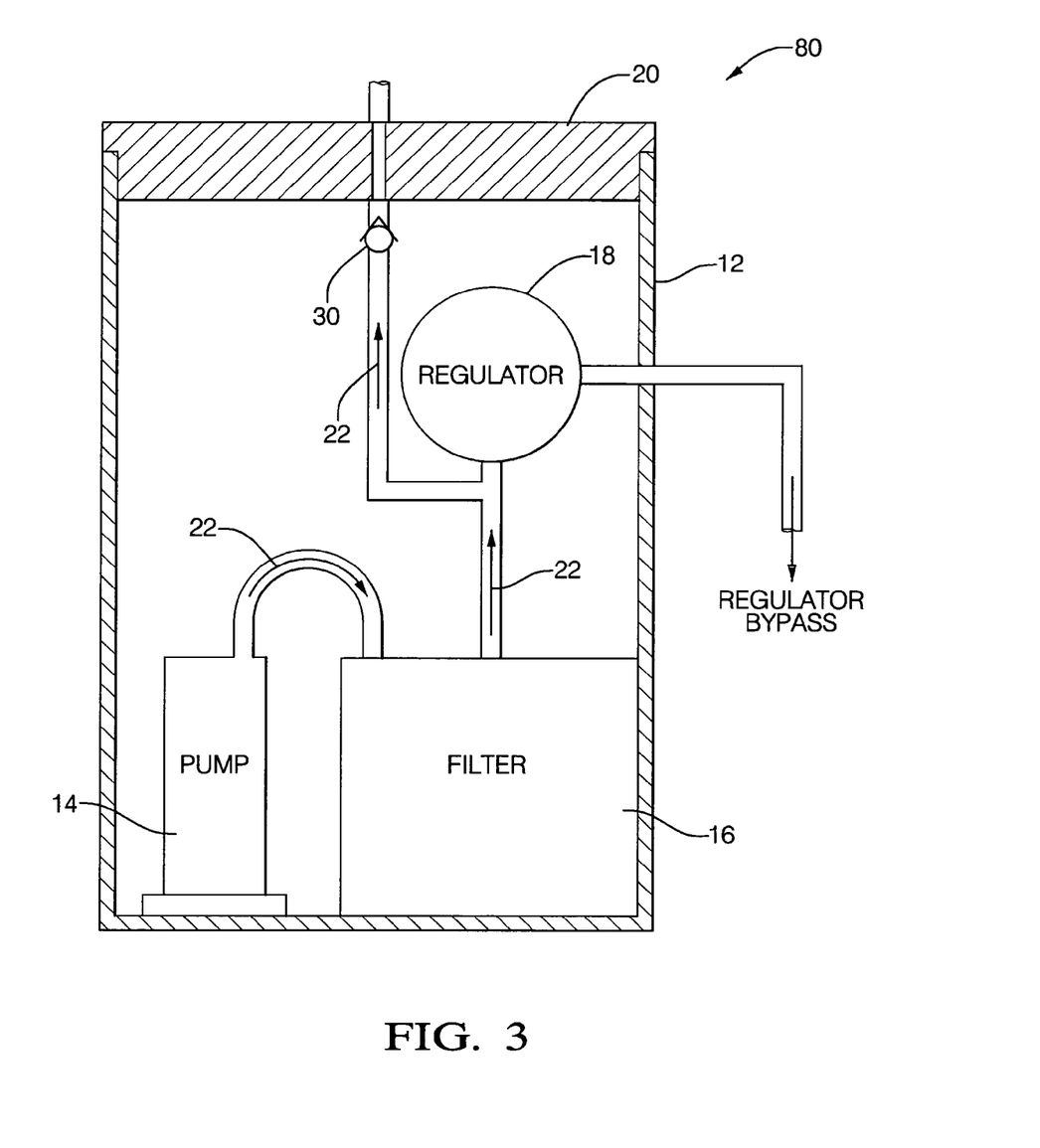
FIG. 3 is a schematic view of a fuel delivery system constructed in accordance with an exemplary embodiment of the present invention.

Valve 30 includes a valve housing 32 extending axially and is configured to be disposed in or become part of one of the conduits of the modular reservoir assembly illustrated in FIG. 3. The valve housing has a body portion 34 that is generally tubular in shape and has a generally circular cross-sectional shape. Of course, other configurations (e.g., square, hexagonal, etc.) are contemplated to be within the scope of the exemplary embodiments of the present invention. The body portion extends axially and has a passageway 36 extending axially therethrough. The valve housing is made of a rigid material such as metal, plastic, or brass. It should also be appreciated that the valve housing is a monolithic structure being integral, unitary, and one-piece.

Disposed within passageway 36 is a pressure valve 38. The pressure valve 38 comprises a body portion 40 which is configured to be axially received within passageway 36.

Body portion 40 is configured to have an annular ring or shoulder portion 42 configured to engage a biasing member 44 that is positioned between shoulder 42 and a portion of a valve seat member 46 of body portion 34. Body portion 40 also comprises a fluid flow path or conduit 48 which will allow fluid to pass therethrough when body portion 40 is moved in the direction of arrow 50 by a pressure force sufficient to overcome the biasing force of biasing member 44.

In order to provide the sealing of valve 38 in the position illustrated in FIG. 2, an O-ring or sealing member 52 is disposed within a cavity of body portion 40 for engagement or sealing against a portion of valve seat 46.

Body portion 40 further comprises an inner passageway 54, which is configured to receive a forward check valve 56. The forward check valve comprises a body portion 58 which is configured to be axially received within passageway 54 for movement therein. Body portion 58 is configured to have an annular ring or shoulder portion 60 configured to engage a biasing member 62 that is positioned between shoulder 60 and a portion of a valve seat member 64 of body portion 40. Body portion 58 also comprises a fluid flow path or conduit 66 which will allow fluid to pass therethrough when body portion 58 is moved in the direction of arrow 68 by a pressure force sufficient to overcome the biasing force of biasing member 62. In order to provide the sealing of valve 56 in the position illustrated in FIG. 2, an O-ring or sealing member 70 is disposed within a cavity of body portion 58 for engagement or sealing against a portion of valve seat 64.

An example of body portion 58 is described and shown as the "valve member" of commonly owned and assigned U.S. patent applications Ser. Nos. 09/935,079; 09/972,289; and 09/992,079 filed Aug. 22, 2001, Sep. 20, 2001 and Nov. 19, 2001 respectively. The contents of which are incorporated herein by reference thereto.

Referring now to FIG. 3, and in accordance with exemplary embodiments of the present invention, a schematic illustration of a fuel delivery system 80 is provided. In an exemplary embodiment, combination fuel system pressure valve and forward check valve 30 is employed and the check valve is removed from its location at the fuel pump. As illustrated in FIG. 3, combination fuel system pressure valve and forward check valve 30 is positioned physically above regulator 18 and fuel pump 14. Accordingly, the following the advantages are found due to the location of combination fuel system pressure valve and forward check valve 30.

As discussed above, an advantage of this embodiment is that valve 30 contains both checking and fuel system overpressure protection features. In addition, the location of this combination valve is above the fuel pressure regulator in a single line forward system. This system architecture eliminates a requirement of the regulator configured to check fuel pressure. This, in turn, allows for a low-cost pressure relief type valve to be used in place of the more costly regulators. For example, regulators in use today that provide fuel pressure checking features typically require expensive lapping operations to produce good surface finishes for sealing system pressure.

Thus, a regulator in this system can be configured to only regulate fuel pressure during a fuel pumping event. For example, the regulator can be set to relieve at fuel pressures of approximately 400 kPa. Of course, pressure thresholds greater than or less than the aforementioned values are contemplated to be within the scope of the present invention.

Another advantage of this system is that while the regulator still remains it is effectively removed from the fuel line circuit on vehicle shut-down because the combination valve is physically above the regulator in the fuel circuit and since the combination valve does not set the system regulation pressure, it can be set to relieve well above the system pressure while still providing the desired system integrity. For example, above the 400 kPa relief setting of the regulator, which is specifically tied to the vehicle requirements such as fuel injector thresholds. An exemplary pressure threshold for the check valve is approximately 20 kPa while the pressure threshold for the relief valve is 600 kPa. Of course, pressure thresholds greater than or less than the aforementioned values for opening combination valve 30 are contemplated to be within the scope of the present invention.

Accordingly, this higher opening pressure of the overpressure valve 38 requires pressure in the fuel rail to achieve a higher level before any fuel is bled off through valve 38. This, in turn, keeps more fuel in the line between the check valve 56 and the engine fuel rail downstream of the check valve on vehicle shutdown. This eliminates or reduces the vacuum conditions which may occur in systems using the regulator to provide the relief valve feature, which may be exacerbated by the cooling of the fuel after fuel has been bled off via a relief valve set at a lower value because it is tied to the regulator setting. By eliminating these vacuum conditions, the start times and start time variations are reduced.

Once the pump is turned on during engine crank the check valve opens and the rail pressure returns to a pressure set by the regulator.

Figure 4:
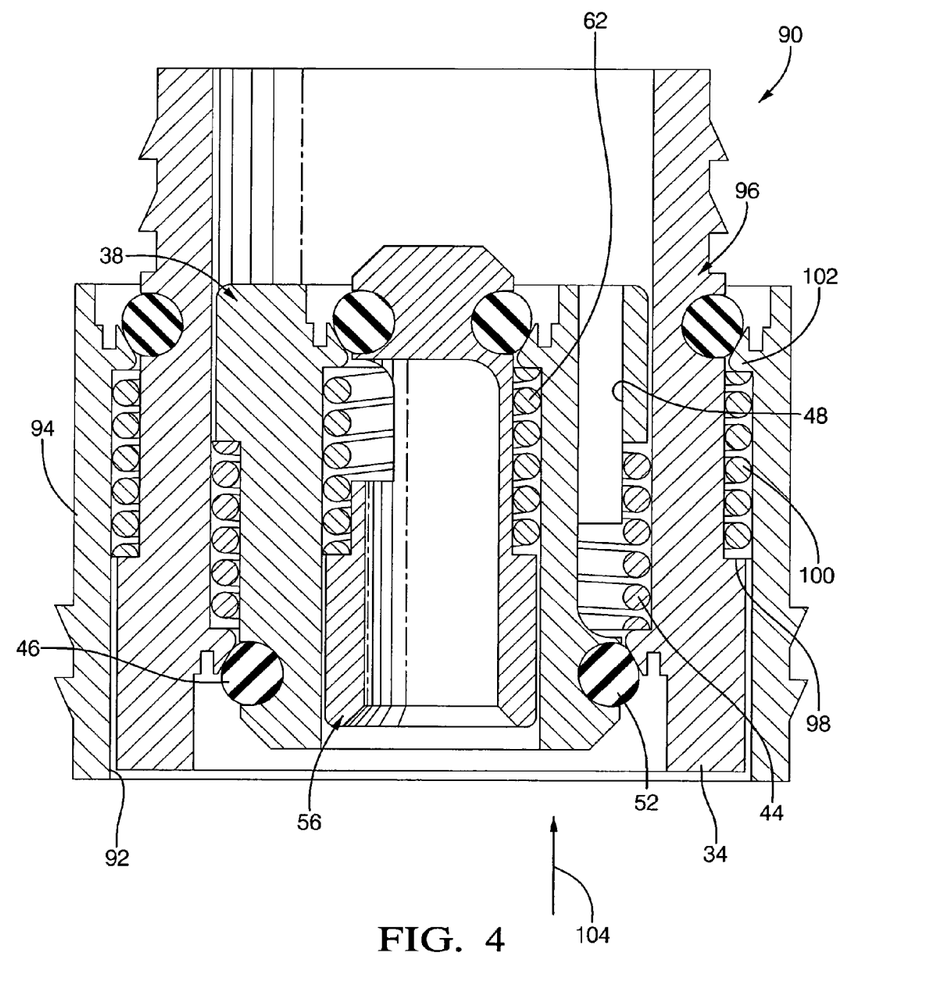
FIG. 4 is a cross sectional view of another combination valve constructed in accordance with an exemplary embodiment of the present invention.

Referring now to FIG. 4, an alternative embodiment is illustrated. Here, a combination fuel system pressure valve, forward check valve and pump pressure valve 90 is illustrated. Combination valve 90 is also contemplated for use in the system depicted in FIG. 3 as well as the same location (physically above the regulator in the fuel system).

This valve design is similar to valve 30 in that a forward check valve 56 and system pressure valve 38 are provided. However, outer body portion 34 is configured to be received within an inner opening 92 of yet another outer housing 94, thereby providing a third valve combined into the assembly. Again, the design illustrated is cost efficient through the use of combining the inner housing of the overpressure valve function with the outer member of the fuel line/forward flow check valve function as well as the combination of outer housing 94 and body portion 34 to provide yet another valve 96 for a fluid path, which in this embodiment configured to a pump overpressure release. In this embodiment valve 96 is configured to provide a release at a pressure that is above the pressure required to open forward check valve 56.

In this embodiment body portion 34 is configured to have an annular ring or shoulder portion 98 configured to engage a biasing member 100 that is positioned between shoulder 98 and a portion of a valve seat member 102 of outer housing 94. Body portion 34 also comprises a fluid flow path or conduit (not shown) which will allow fluid to pass therethrough when body portion 34 is moved in the direction of arrow 104 by a pressure force sufficient to overcome the biasing force of biasing member 100, which will be greater than the force required to overcome biasing member 62 of the forward check valve.

Therefore, and since the three valves are combined into one unit (valve 90) there is only one installation interface while three separate valves are provided, which typically would require at least three installation interfaces. Moreover, and as illustrated in FIG. 3, the positioning of the valve removes the valve from the fuel pump and places them in the modular reservoir assembly unit.

The use of combination valve 30 or 90 above the regulator requires only one pre-tested valve assembly to be installed above the fuel pump, rather than the typical installation of components for two or three separate valves. As described above with regard to FIG. 3, the location of either combination valve 30 or 90 places the check valve above the regulator. This effectively removes the regulator from the fuel circuit on vehicle shutdown.

Figure 5:
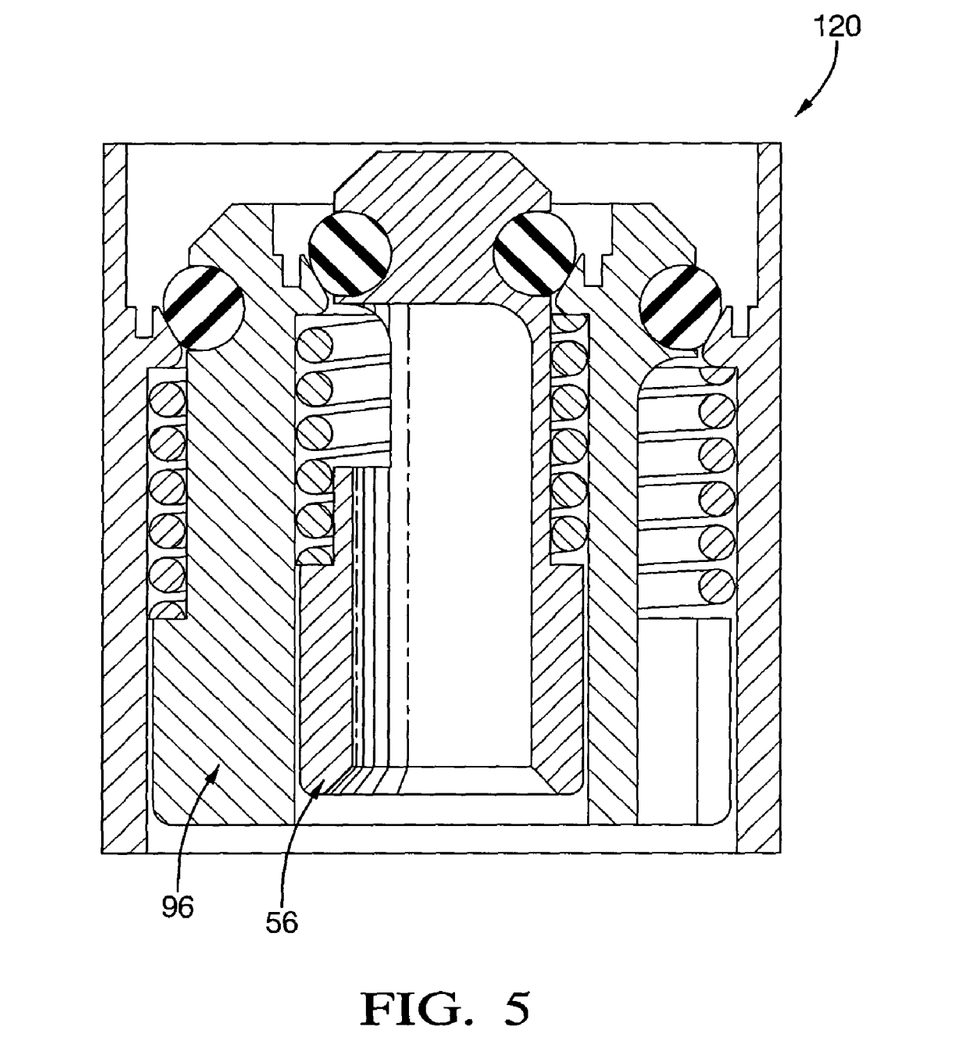
FIG. 5 is a cross sectional view of yet another combination valve constructed in accordance with an exemplary embodiment of the present invention.

Referring now to FIG. 5 another alternative embodiment is illustrated. In this embodiment, a combination pump overpressure protection and forward check valve 120 is provided. Here a forward check valve 56 as discussed with regard to the embodiments of FIGS. 2 and 4 is combined with a pump overpressure valve 96 discussed with regard to FIG. 4. The elements of combination pump overpressure protection and forward check valve 120 are similar to those of valve 30 however, the relief direction of valve 96 is opposite to that of valve 38 discussed with regard to FIG. 2. As also discussed above valve 96 is configured to provide a release at a pressure that is above the pressure required to open forward check valve 56

In addition, an exemplary location of combination valve 120 would be the same location as the forward flow check valve illustrated in FIG. 1.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. It should also be noted that the terms "first", "second", and "third" and the like may be used herein to modify elements performing similar and/or analogous functions. These modifiers do not imply a spatial, sequential, or hierarchical order to the modified elements unless specifically stated.

What is claimed is:

1. A combination valve for fuel delivery system of a vehicle having an engine, the fuel delivery system being configured to pump fuel to the engine and the fuel delivery system has a regulator for regulating the pressure of the fuel when it is being pumped to the engine by the fuel delivery system, the combination valve comprising:

an outer housing defining an inner opening for slidably receiving a body portion of a pump pressure relief valve therein, said body portion of said pump pressure relief valve defining an inner opening for slidably receiving a body portion of a system pressure relief valve therein, said body portion of said system pressure relief valve defining an inner opening for slidably receiving a body portion of a check valve therein, said body portion of said check valve being configured to provide a first fluid pathway in a first direction when said body portion of said check valve moves from a closed position to an open position as said body portion of said check valve moves in said first direction within said inner opening of said body portion of said system pressure relief valve, said body portion of said system pressure relief valve being configured to provide a second fluid pathway in a second direction when said body portion of said system pressure relief valve moves from a closed position to an open position as said body portion of said system pressure relief valve moves in said second direction within said inner opening of said pump pressure relief valve, said body portion of said pump pressure relief valve being configured to provide a third fluid pathway in a said first direction when said body portion of said pump pressure relief valve moves from a closed position to an open position as said body portion of said pump pressure relief valve moves in said first direction within said inner opening of said outer housing, wherein said first direction being opposite to said second direction.

2. The combination valve as in claim 1, wherein said first direction is the direction fuel flows to the engine when the pump is pumping fuel to the engine and a portion of said second fluid pathway is disposed between said inner opening of said body portion of said pump pressure relief valve and an outer surface of said body portion of said system pressure relief valve.

3. The combination valve as in claim 2, wherein said outer surface of said body portion of said system pressure relief valve is configured to engage a biasing member disposed between said outer surface of said body portion of said system pressure relief valve and a portion of a valve seat member of said system pressure relief valve, said biasing member providing a biasing force for maintaining said system pressure relief valve in said closed position.

4. The combination valve as in claim 3, wherein said valve seat member of said system pressure relief valve is disposed on said inner opening of said body portion of said pump pressure relief valve.

5. The combination valve as in claim 4, wherein said valve seat member of said system pressure relief valve is configured to engage a sealing member of said system pressure relief valve when said system pressure relief valve is in said closed position.

6. The combination valve as in claim 5, wherein said sealing member an O-ring.

7. The combination valve as in claim 5, wherein the biasing member engaging said valve seat member of said system pressure relief valve determines the amount of pressure required to open said system pressure relief valve, which is greater than the pressure at which the regulator regulates the fuel when it is being pumped to the engine.

8. The combination valve as in claim 7, wherein a portion of said first fluid pathway is disposed between an inner opening of said body portion of said check valve and an outer surface of said body portion of said check valve and said outer surface of said body portion of said check valve is configured to engage a biasing member disposed between said outer surface of said body portion of said check valve and a portion of a valve seat member of said check valve, said biasing member providing a biasing force for maintaining said check valve in said closed position, wherein said valve seat member of said check valve is disposed on said inner opening of said body portion of said system pressure relief valve.

9. The combination valve as in claim 7, wherein said valve seat member of said check valve is configured to engage a sealing member of said check valve when said check valve is in said closed position.

10. The combination valve as in claim 9, wherein said system pressure relief valve is a valve which allows flow therethrough under a first set of conditions or pressures, while preventing back flow.

11. The combination valve as in claim 10, wherein the regulator has a relief setting of approximately 400 kPa and said system pressure relief valve opens at approximately 600 kPa and said check valve opens at approximately 20 kPa.

12. The combination valve as in claim 10, wherein a portion of said third fluid pathway is disposed between said inner opening of said outer housing and an outer surface of said body portion of said pump pressure relief valve and said outer surface of said body portion of said pump pressure is configured to engage a biasing member disposed between said outer surface of said body portion of said pump pressure and a portion of a valve seat member of said pump pressure valve, said biasing member providing a biasing force for maintaining said pump pressure valve in said closed position, wherein said valve seat member of said pump pressure valve is disposed on said inner opening of said body portion of said outer housing valve.

13. The combination valve as in claim 12, wherein said valve seat member of said pump pressure valve is configured to engage a sealing member of said pump pressure valve when said pump pressure valve is in said closed position.

* * * * *